US012169792B2

(12) United States Patent
Vega et al.

(10) Patent No.: US 12,169,792 B2
(45) Date of Patent: Dec. 17, 2024

(54) ADAPTIVE MULTI-AGENT COOPERATIVE COMPUTATION AND INFERENCE (71) Applicant: International Business Machines Corporation, Armonk, NY (US)

(72) Inventors: Augusto Vega, Mount Vernon, NY (US); Pradip Bose, Yorktown Heights, NY (US); Alper Buyuktosunoglu, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1493 days.

(21) Appl. No.: 16/015,986

(22) Filed: Jun. 22, 2018

(65) Prior Publication Data

US 2019/0392333 A1 Dec. 26, 2019

(51) Int. Cl.
*G06N 7/01* (2023.01)
*G05D 1/00* (2024.01)
(Continued)

(52) U.S. Cl.
CPC ............... *G06N 7/01* (2023.01); *G06N 20/00* (2019.01); *H04L 63/1458* (2013.01); *G05D 1/0088* (2013.01); *H04L 67/12* (2013.01)

(58) Field of Classification Search
CPC .......... G06N 7/005; G06N 7/00; G06N 20/00; G06N 20/10; G06N 20/20; G06N 5/00;
(Continued)

(56) References Cited

U.S. PATENT DOCUMENTS 8,234,067 B2   7/2012  Bauer et al.
8,352,409 B1 * 1/2013  Satish ................... G06N 20/00
                                                    706/52
(Continued)

FOREIGN PATENT DOCUMENTS

AU    2016262563 A1    11/2017
CN    102014116 A       4/2011
(Continued)

OTHER PUBLICATIONS

Zhang et al. "Intrusion Detection Techniques for Mobile Wireless Networks", 2003 https://link.springer.com/content/pdf/10.1023/A:1024600519144.pdf (Year: 2003).*
(Continued)

*Primary Examiner* — Ryan C Vaughn
(74) *Attorney, Agent, or Firm* — Garg Law Firm, PLLC; Rakesh Garg; James Olsen (57) ABSTRACT In a first device, a local classification and a local classification confidence score corresponding to an event input are computed. At the first device in response to a broadcast request, a remote classification and a remote classification confidence score corresponding to the event input are received, the remote classification and the remote classification confidence score being computed at a second device. At the first device, a consensus classification including the most frequent classification from a set of all received remote classifications and the local classification is formed, provided the number of classifications including the most frequent classification exceeds a threshold. In response to a consensus classification confidence score corresponding to the consensus classification exceeding a confidence threshold, a local classification model is updated. Based on the local classification and the consensus classification, the event input is assigned to a classification.

13 Claims, 6 Drawing Sheets (51) Int. Cl.
*G06N 20/00* (2019.01)
*H04L 9/40* (2022.01)
*H04L 67/12* (2022.01)

(58) Field of Classification Search
CPC ............ G06N 5/02; G06N 5/022; G06N 5/04;
G06N 3/00; G06N 3/004; G06N 3/006;
H04L 63/1458; H04L 67/12; G05D
1/0088
See application file for complete search history.

(56) References Cited

U.S. PATENT DOCUMENTS

| | | | |
|---|---|---|---|
| 8,411,567 | B2 | 4/2013 | Wong et al. |
| 9,336,480 | B1 | 5/2016 | Owechko |
| 9,667,512 | B2 | 5/2017 | Iyer et al. |
| 9,749,806 | B2 | 8/2017 | Smith et al. |
| 9,857,792 | B2 | 1/2018 | Ammar et al. |
| 2007/0288132 | A1 | 12/2007 | Lam |
| 2010/0205122 | A1 | 8/2010 | Abramson |
| 2013/0086192 | A1 | 4/2013 | Frank et al. |
| 2013/0123981 | A1 | 5/2013 | Lee et al. |
| 2016/0044073 | A1 | 2/2016 | Rosenberg |
| 2016/0217388 | A1* | 7/2016 | Okanohara ............ G06N 20/00 |
| 2016/0239736 | A1 | 8/2016 | Sarah |
| 2016/0352825 | A1 | 12/2016 | Burba et al. |
| 2018/0032875 | A1 | 2/2018 | Bostick et al. |
| 2018/0121763 | A1* | 5/2018 | Surnilla .................... G08G 1/16 |
| 2018/0144265 | A1* | 5/2018 | Bonawitz ................. G06N 7/06 |
| 2019/0065744 | A1* | 2/2019 | Gaustad ................. G06F 21/562 |

FOREIGN PATENT DOCUMENTS

| | | |
|---|---|---|
| CN | 106575377 A | 4/2017 |
| CN | 107223260 A | 9/2017 |
| CN | 107850895 A | 3/2018 |
| EP | 2293513 A1 | 3/2011 |
| EP | 3143560 A1 | 3/2017 |

OTHER PUBLICATIONS

Giusti et al. "Cooperative sensing and recognition by a swarm of mobile robots", 2012 https://ieeexplore.ieee.org/abstract/document/6385982 (Year: 2012).*

Galland, Stephane; "Multiagent Systems and Agent-Based Simulation", IRTES-SET UTBM, Hasselt, Belgium, Jul. 14, 2015, pp. 1-141.

Foster, Anna; "Machine Learning Techniques Applied to Wireless Ad-Hoc Networks: Guide and Survey", ISSNIP IEEE 3rd Inter. Conf. on, Dec. 3-6, 2007, pp. 365-370.

Kuremoto et al.; "Adaptive Swarm Behavior Acquisition by a Neuro-Fuzzy System and Reinforcement Learning Algorithm", IEEJ Transactions on Electronics Information and Systems, Jan. 2013, pp. 1-24.

Kammoun et al.; "Adapt-Traf: an adaptive multiagent road traffic management system based on hybrid ant-hierarchical fuzzy model", Transportation Research Part C, vol. 42, May 2014, pp. 147-167.

Forster; Machine Learning Techniques Applied to Wireless Ad-Hoc Networks: Guide and Survey, Jan. 2007.

Mohilay; Honda's intriguing safe swarm concept for safer driving borrows from the fish!, 2018.

Borra et al; Distributed Consensus Agreement of a Real Swarm Robotic System, Switzerland 2015.

P201703124cn01, OA1, Application No. 201910540137.9, Jul. 5, 2022.

Beni et al., Swarm Intelligence in Cellular Robotic Systems, Proceed. NATO Advanced Workshop on Robots and Biological Systems, Jun. 26-30, 1989.

Tan et al., Research Advance in Swarm Robotics, Defence Technology 9 (2013) 18e39, Mar. 2013.

Kanellos, 152,000 Smart Devices Every Minute In 2025: IDC Outlines The Future of Smart Things, Mar. 3, 2016, http://www.forbes.com/sites/michaelkanellos/2016/03/152000-smart-devices-every-minute-in-2025-idc-outlines-the-future-of-smart-things/#6c86aebc69a7.

* cited by examiner

ADAPTIVE MULTI-AGENT COOPERATIVE COMPUTATION AND INFERENCE

GOVERNMENT RIGHTS

This invention was made with Government support under HR0011-13-C-0022 awarded by Defense Advanced Research Projects Agency, Microsystems Technology Office (MTO). The Government has certain rights in this invention.

TECHNICAL FIELD

The present invention relates generally to a method, system, and computer program product for intelligent problem solving. More particularly, the present invention relates to a method, system, and computer program product for adaptive multi-agent cooperative computation and statistical inference with in-field learning.

BACKGROUND

Swarm Intelligence (SI)—the collective behavior of decentralized, self-organized systems, natural or artificial—is relatively well-known. Typical SI systems include a population of simple units (or agents)—devices or instances of a software-hardware appliance—interacting locally with one another and with their environment. (An agent is a software-hardware device or computational unit. The terms "agent", "unit" and "device" are used herein interchangeably.) These agents follow simple rules, and although there is no centralized control structure dictating how individual agents should behave, local, and to a certain degree random, interactions between such units lead to the emergence of "intelligent" global behavior, unknown to the individual units.

"In-factory" programming refers to a set of rules or behaviors programmed into an agent or device when the associated application is installed or device firmware or software is programmed. Each agent or device receives the same set of rules or behaviors, and these rules or behaviors can only be changed by updating the corresponding software. In contrast, "in-field" programming refers to a set of rules or behaviors that, once programmed, can continue to change to adapt to new circumstances.

Traditional SI suffers from a fundamental limitation: swarm behavior is strictly confined to its in-factory programming—the pre-defined set of simple rules that govern each individual. The rules, once defined, are fixed until the software implementing the rules is updated.

Machine learning is also well-known and is frequently used to solve classification (or inference) problems. In classification, outputs are divided into two or more classes, and the learner must produce a model that assigns inputs to one or more of these classes. This is typically tackled in a supervised manner, with a model first being trained on correct classifications, then migrated to individual instances as in-factory programming. Then each instance uses its copy of the model on field data needing classification.

SUMMARY

The illustrative embodiments provide a method, system, and computer program product. An embodiment includes a method that computes, in a first device in response to an event input using a processor and a memory, a local classification and a local classification confidence score corresponding to the event input. An embodiment receives, at the first device in response to a broadcast request, a remote classification and a remote classification confidence score corresponding to the event input, the remote classification and the remote classification confidence score being computed at a second device. An embodiment forms, at the first device, a consensus classification comprising the most frequent classification from a set of all received remote classifications and the local classification, provided the number of classifications comprising the most frequent classification exceeds a threshold. An embodiment updates, in response to a consensus classification confidence score corresponding to the consensus classification exceeding a confidence threshold, a local classification model. An embodiment assigns, based on the local classification and the consensus classification, the event input to a classification.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Although SI devices are flexible, the rules governing each device's behavior are pre-defined and relatively simple. The illustrative embodiments recognize that these kinds of rules cannot be quickly adjusted to adapt to changing circumstances encountered in the outside world, and are not enough to cope with unexpected situations that require real or near-real time adaptation—like sudden (unexpected) changes in the surrounding environment, faults, or the need to learn new tasks on the fly. Machine-learning classifiers can learn from experience, but also do not cope well with sudden changes in in-field data patterns that deviate significantly from datasets used during in-factory training.

Two examples illustrate these situations, one involving autonomous vehicles and the other from the field of cybersecurity.

Autonomous vehicles must recognize objects and react accordingly. For example, an autonomous car or truck must recognize a stop sign and stop the vehicle in the appropriate place, then continue on the route when safe to do so. However, such recognition becomes challenging when operating during reduced visibility (e.g. in rain or fog) or when faced with an object the car has not been trained for (e.g. a stop sign with a different color or shape, or text in a different language) or when presented with a deformed object (e.g., a deformed stop sign, a broken or partial sign, or a defaced sign). As a result, an adaptive classification solution is needed that adapts in real-time to changing circumstances, such as object contexts.

In the field of cybersecurity, networks must be protected against distributed denial-of-service (DDoS) attacks, in which an attacker seeks to make a network resource unavailable to its intended users by temporarily or indefinitely disrupting services of a host connected to the network. Denial of service is typically accomplished by flooding the targeted resource with superfluous requests in an attempt to overload systems and prevent legitimate requests from being fulfilled. Although "distributed" implies that the attack comes from multiple sources, DDoS traffic usually comes from a limited set of IP addresses.

In contrast, a network should welcome so-called "flash crowds", when the network is flooded with legitimate messages during busy periods. For example, Cyber Monday, the Monday after the US Thanksgiving holiday, is typically a very heavy day for US online transactions, aided by special sales prices on many popular sites. Crowd response to an unplanned or unforeseen event somewhere in the world might also trigger a flood of legitimate messages in a similar manner.

The illustrative embodiments recognize that to protect the network, administrators must discriminate DDoS attack traffic from flash crowd traffic, effectively and in real time. However, both types of traffic have very similar properties, except for the source IP address. Programming specific "known-bad" IP addresses in advance is also largely ineffective, as attackers can switch to different sources on the fly. As a result, an adaptive classification solution is needed that adapts in real-time to changing circumstances, such as in the context of data traffic.

The illustrative embodiments recognize that the presently available tools or solutions do not address these needs or provide adequate solutions for these needs. The illustrative embodiments used to describe the invention generally address and solve the above-described problems and other problems related to adaptive multi-agent cooperative computation and statistical inference with in-field learning.

An embodiment can be implemented as a software application. The application implementing an embodiment can be configured as a modification of an existing system operating in a specific context—including but not limited to the object context and data traffic context in the above examples, as a separate application that operates in conjunction with the existing system, a stand-alone application, or some combination thereof. Further, although the illustrative embodiments are described with reference to specific non-limiting example event inputs, embodiments are applicable to other event inputs as well. Those of ordinary skill in the art will be able to adapt an embodiment described herein to other event inputs, e.g., classifying human behavior from audio or video inputs, and many others.

Particularly, some illustrative embodiments provide a method by which an event can be classified, in cooperation with other devices, and all the cooperating devices can adapt to the resulting classification.

For example, an instance of an embodiment receives an event input requiring classification. The instance can be an application, for example running on a server and in communication with other instances of the application, or a software-controlled device, for example an Internet-of-Things device or an autonomous vehicle, in communication with other instances of the software-controlled device or similar devices.

In response, the instance computes a classification (local to that instance) corresponding to the event input and a confidence score reflecting a degree of confidence that the classification does correspond to the event input. The instance computes the classification and confidence score based on an internal classification model, which has been previously trained to classify event inputs into categories based on known machine learning techniques, rules-based expert systems technology, or other known AI (artificial intelligence) paradigms.

The confidence score can be expressed as a percentage. For example, a classification with a 90 percent confidence score would mean that the classification algorithm is 90 percent sure that this classification is correct. On the other hand, a classification with a 20 percent confidence score would mean that the classification algorithm is only 20 percent sure that this classification is correct—so likely not correct. If a confidence score is below a threshold, an embodiment can optionally deem the corresponding classification unreliable and discard it.

In parallel with computation of a local classification, an embodiment also broadcasts a request to other nearby embodiments capable of classifying the same event input. In response, other embodiments, if they are able, each respond with their own classifications and confidence scores, based on their own internal computational models which have also previously been trained to classify event inputs into categories. Note that although a local and remote device are classifying input related to the same event, each device may perceive the event input differently and may have a differently-trained internal model. As a result, two devices may classify the same event input into different categories, or classify the same event input into the same category but with differing confidence scores. Further, an embodiment can also broadcast the request before or after the local classification, as well as in parallel with the local classification. For example, an embodiment can be configured to broadcast the request only if the local classification is insufficiently reliable.

An illustrative embodiment waits for remote responses for a designated timeout period. In one example case, if no other suitable devices respond within the timeout period, the embodiment assumes that either none are within broadcast range or none nearby can contribute a suitable classification. In this case, the embodiment simply relies on local classifications. Similarly, in another example case, if less than a threshold number of other suitable devices respond within the timeout period, the embodiment assumes that either an insufficient number of devices are within broadcast range or an insufficient number of devices nearby can contribute a suitable classification. In this case, the embodiment simply relies on local classifications.

Once any, or a sufficient number of remote classifications are received, an embodiment determines a consensus classification, using a local classification (if above a confidence threshold) as well as any remote classifications. For example, the embodiment can choose the most frequent classification as the consensus classification. For example, if there are four classifications in the list and three classify the event input into Category A while one classifies the event input into Category B, the consensus classification would be Category A.

The embodiment also determines a consensus classification confidence score corresponding to the consensus classification. For example, the embodiment consensus classification confidence score can be the weighted average of all the confidence scores corresponding to the consensus classification. For example, continuing the example above, if the confidence scores for the three Category A determinations were 80 percent, 70 percent, and 75 percent, and all were weighted equally, the consensus confidence score would be 75 percent.

An embodiment adjusts the weights to reflect the correctness of previous classifications from a particular device, particular type of device, or to reflect other conditions. For example, if the embodiment detected that a device of type C had misclassified an event input, the embodiment lowers the weight corresponding to that device's confidence score. As a result, a future response from a device of type C, even if matching the consensus, will play a smaller role in determining the consensus confidence score. Similarly, one device type might include sensors that perform better in daylight conditions, while another might include sensors that perform better at night. Over time, an embodiment learns which device types can be trusted more or less depending on specific conditions, and adapt accordingly.

The embodiment can also require that the most frequent classification be above a threshold. Such a requirement avoids determination of a false consensus, for example when all the classifications are different and there is no clear majority vote. Similarly, the embodiment can require that the consensus classification confidence score be above a threshold. For example, if all the classifications match but each confidence score is poor, the likelihood of the classifications actually being correct is still poor. Only classifications that are sufficiently reliable should be used in later processing stages.

Note that these methods of determining the consensus classification and confidence score are only non-limiting examples. Those skilled in the art will recognize that other methods may be used to choose the consensus classification and confidence score, and that these other methods are also contemplated within the scope of the illustrative embodiments.

Once the embodiment has determined a sufficiently reliable consensus classification, a device's classification model is updated. This allows one device to learn from the classifications supplied by other devices. Thus all devices can adapt to changing, unforeseen conditions as appropriate.

Finally, an embodiment classifies the event input and performs an action based on the classification. An embodiment can classify the event input according to the consensus classification, the local classification, or a combination of the two. For example, if the consensus classification confidence score is above a threshold, an embodiment classifies the event input based on the consensus classification score; otherwise an embodiment classifies the event input based on the local classification. Optionally, an embodiment broadcasts its classification to other devices, allowing other devices to learn from one device's experiences.

An embodiment as described herein can be adapted to the field of autonomous vehicles and the need in that field for an object classification solution that adapts in real-time to changing circumstances. Among other tasks, autonomous vehicles must recognize objects and react appropriately. However, one vehicle's view of an object may be obscured, but a nearby vehicle has a better view, may be closer, or may already have experience with a novel object.

An embodiment can be installed in multiple autonomous vehicles. Owing to the installations, The vehicles are then enabled to interact with each other as well as, optionally, to a back-end cloud infrastructure, for example through vehicle-to-everything (V2X) communication. Each vehicle recognizes objects in real time using a combination of on-board computing capabilities and the support of other nearby vehicles and the cloud. The on-board computing capabilities can include a convolutional neural network for image recognition and classification.

For example, an embodiment adapted for autonomous vehicle use receives an event input, such as sensor data, requiring classification. Such sensor data could be, for example, an image of a stop sign, that must be classified to determine that it is indeed a stop sign. In response, the embodiment—mounted in an autonomous vehicle—computes a local classification corresponding to the event input and a confidence score reflecting a degree of confidence that the classification does correspond to the event input. The embodiment computes the classification and confidence score based on an internal classification model, which has been previously trained to classify sensor data event inputs into categories based on known machine learning techniques.

In parallel with the local classification, an embodiment also broadcasts a request to other devices—either nearby autonomous vehicles or a back-end cloud infrastructure—also capable of classifying the same event input. For example, in an embodiment adapted to autonomous vehicles, the request includes a request type (e.g. traffic sign recognition or object recognition), raw data (e.g. a traffic sign image), and the requester's geolocation information. In response, other devices, if they are able, each respond with their own classifications and confidence scores, based on their own internal computational models which have also previously been trained to classify event inputs into categories. For example, Car A may obtain image data including a stop sign, but the weather is foggy, and Car A may be too far away to classify the image as a stop sign with a sufficiently high confidence score. Car A broadcasts a request for help, and Car B, closer to the sign and with a clearer view, responds by classifying the image as a stop sign with higher confidence score. As well, although an application running in a back-end cloud infrastructure may not have a direct view of the object being classified, the cloud infrastructure may be able to supply a classification based on geolocation information—such as information that there is indeed a stop sign at this location.

Once any remote classifications are received, the embodiment determines a consensus classification, using a local classification (if above a confidence threshold) as well as any remote classifications. The embodiment also determines a consensus classification confidence score corresponding to the consensus classification. Once the embodiment has determined a sufficiently reliable consensus classification, a device's classification model can be updated. This allows one device to learn from the classifications supplied by other devices. Here, continuing the example, the consensus classification, using input from both Cars A and B, is that the image is a stop sign. Car A uses this information to improve its internal recognition model for stop signs, particularly in foggy conditions.

Finally, an embodiment—here, an autonomous vehicle—can classify the event input—here sensor data—and perform some action based on the classification. Continuing the previous example, Car A, having recognized a stop sign with the aid of Car B, stops the vehicle at the appropriate location relative to the stop sign. Optionally, an embodiment can broadcast its classification to other devices, allowing other devices to learn from one device's experiences.

Another illustrative embodiment can be adapted to the field of cybersecurity and the need for a traffic classification solution that adapts in real-time to changing circumstances. Among other tasks, network nodes must distinguish flash crowds (legitimate traffic) from DDoS attacks (illegitimate traffic) and react appropriately. One network node is unlikely to be able to classify traffic by itself, but several nearby network nodes, comparing source IP addresses for the traffic, can work together to do so.

An embodiment can be installed in multiple network nodes that interact with each other. Each node monitors traffic from source IP addresses seen in the recent past. If an IP address has been seen frequently, it might belong to a DDoS attack and any traffic the address generates should be ignored.

To implement this behavior, an embodiment adapted for cybersecurity use receives an event input, such as an input packet from an IP address, requiring classification. In response, the embodiment—a network node—computes a local classification—legitimate or fraudulent—corresponding to the event input and a confidence score reflecting a degree of confidence that the classification does correspond to the event input. The embodiment computes the classification and confidence score based on an internal classification model, which has been previously trained to classify sensor data event inputs into categories based on known machine learning techniques.

In parallel with the local classification, an embodiment also broadcasts a request to other devices—typically its eight neighboring network nodes—also capable of classifying the same event input. In response, the other network nodes, if they are able, each respond with their own classifications and confidence scores, based on their own internal computational models which have also previously been trained to classify event inputs into categories.

Once any remote classifications are received, the embodiment determines a consensus classification and a consensus classification confidence score corresponding to the consensus classification. Once the embodiment has determined a sufficiently reliable consensus classification, a network node's classification model can be updated. This allows one network node to learn from the classifications supplied by other network nodes.

Finally, an embodiment—here, operating in a network node—can classify the event input—here traffic packets—and perform an action—packet filtering—based on the classification. Optionally, an embodiment can broadcast its classification to other network nodes, allowing others to learn from one network node's experiences.

The manner of adaptive multi-agent cooperative computation and statistical inference with in-field learning described herein is unavailable in the presently available methods. A method of an embodiment described herein, when implemented to execute on a device or data processing system, comprises substantial advancement of the functionality of that device or data processing system in adaptively performing classification of real-time in-field events using dynamic groups of multiple cooperating devices that might be operating within a defined region at a given time.

The illustrative embodiments are described with respect to certain types of events, models, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
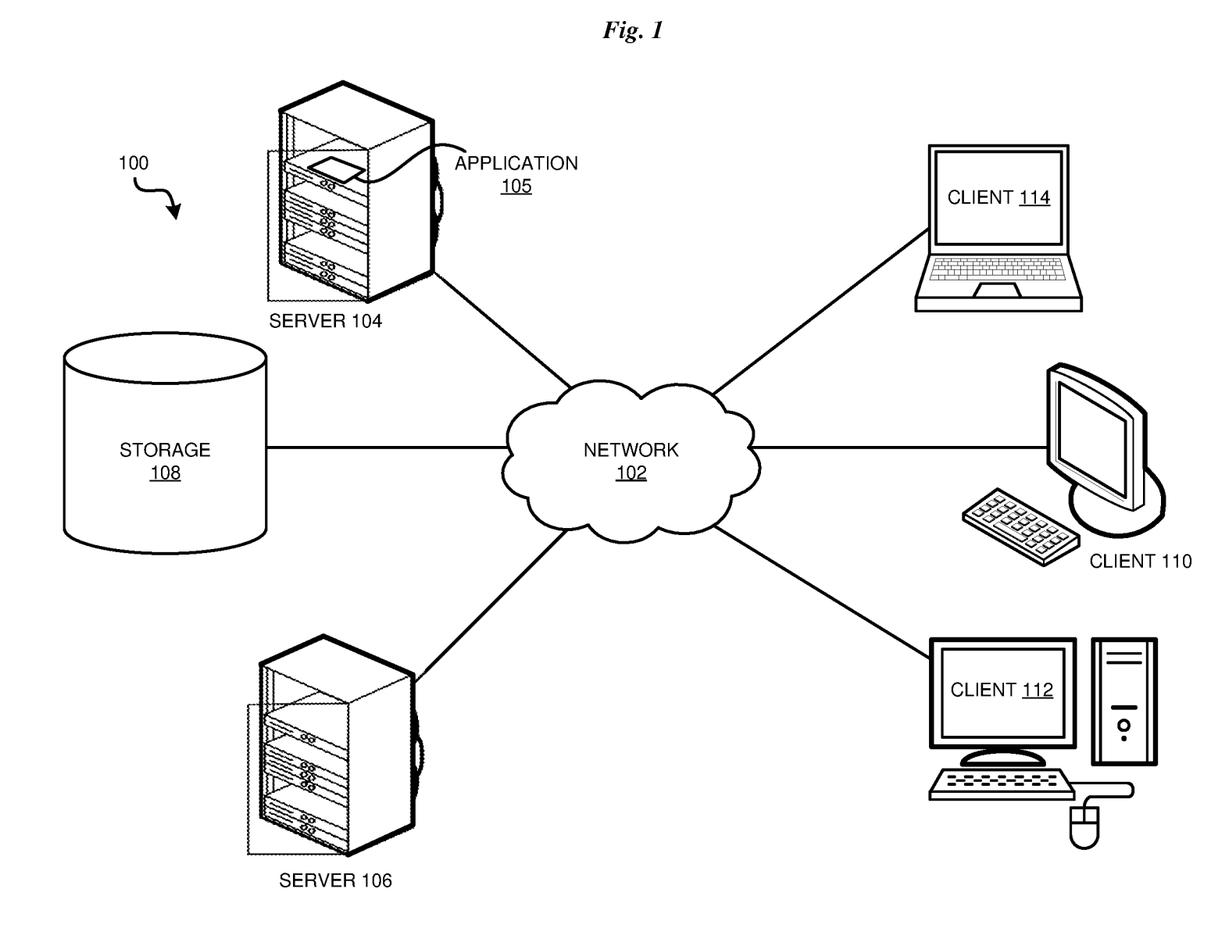
FIG. 1 depicts a block diagram of a network of data processing systems in which illustrative embodiments may be implemented.
Figure 2:
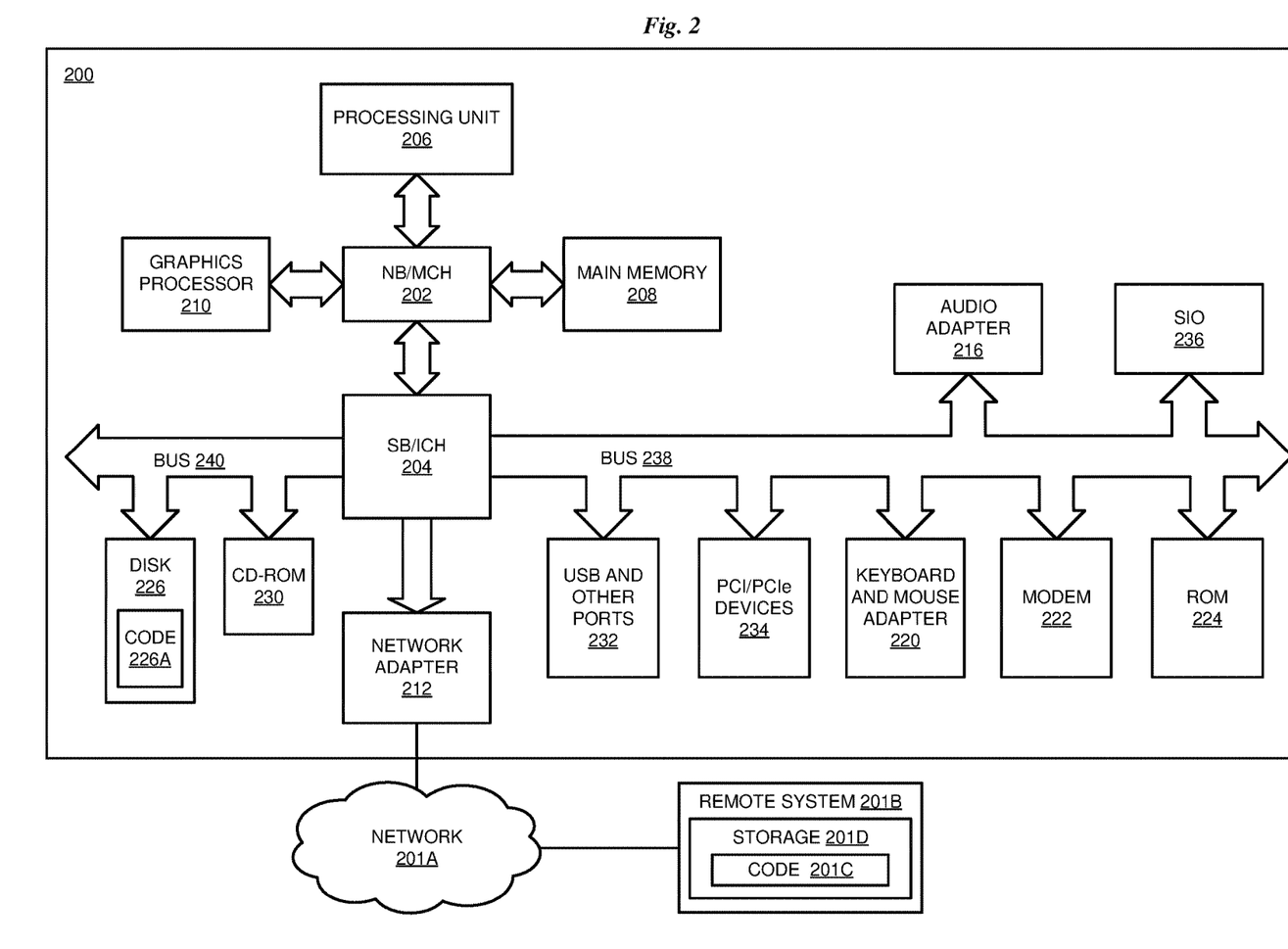
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Application 105 implements an embodiment described herein. Application 105 runs in servers 104 and 106, or any other suitable environment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, for example an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as server 104 in FIG. 1 in which computer usable program code or instructions implementing the processes of the illustrative embodiments may be located. Data processing system 200 is described as a computer only as an example, without being limited thereto. Implementations in the form of other devices, such as server 104 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device. Data processing system 200 may also take the form of an autonomous vehicle.

Where a computer or data processing system is described as a virtual machine, a virtual device, or a virtual component, the virtual machine, virtual device, or the virtual component operates in the manner of data processing system 200 using a virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

FIG. 1 depicts certain components that are usable in an example implementation of an embodiment adapted for traffic classification that adapts in real-time to changing circumstances. Application 105 is an example application that runs in server 104 to implement the embodiment. Application 105 can also run in server 106, clients 110, 112, 114, and any other suitable location on network 102.

Application 105 can be installed in multiple network nodes within network 102 that interact with each other. Each node monitors traffic from source IP addresses seen in the recent past and classifies incoming traffic into "legitimate" and "fraudulent" based on its source IP address.

To implement this behavior, application 105 receives an event input, such as an input packet from an IP address, requiring classification. In response, application 105 computes a local classification corresponding to the event input and a confidence score reflecting a degree of confidence that the classification does correspond to the event input. The application computes the classification and confidence score based on an internal classification model, which has been previously trained to classify sensor data event inputs into categories based on known machine learning techniques.

In parallel with the local classification, application 105 also broadcasts a request to other instances of application 105 running in nearby network nodes and also capable of classifying the same event input. In response, the other instances of application 105, if they are able, each respond with their own classifications and confidence scores, based on their own internal computational models which have also previously been trained to classify event inputs into categories.

Once any remote classifications are received, application 105 determines a consensus classification and a consensus classification confidence score corresponding to the consensus classification, then updates its classification model. This allows one instance of application 105 to learn from the classifications supplied by other instances of application 105.

Finally, application 105 classifies the traffic packets and filters out fraudulent packets. Optionally, one instance of application 105 can broadcast its classification to other instances, allowing the others to learn from one's experiences.

Figure 3:
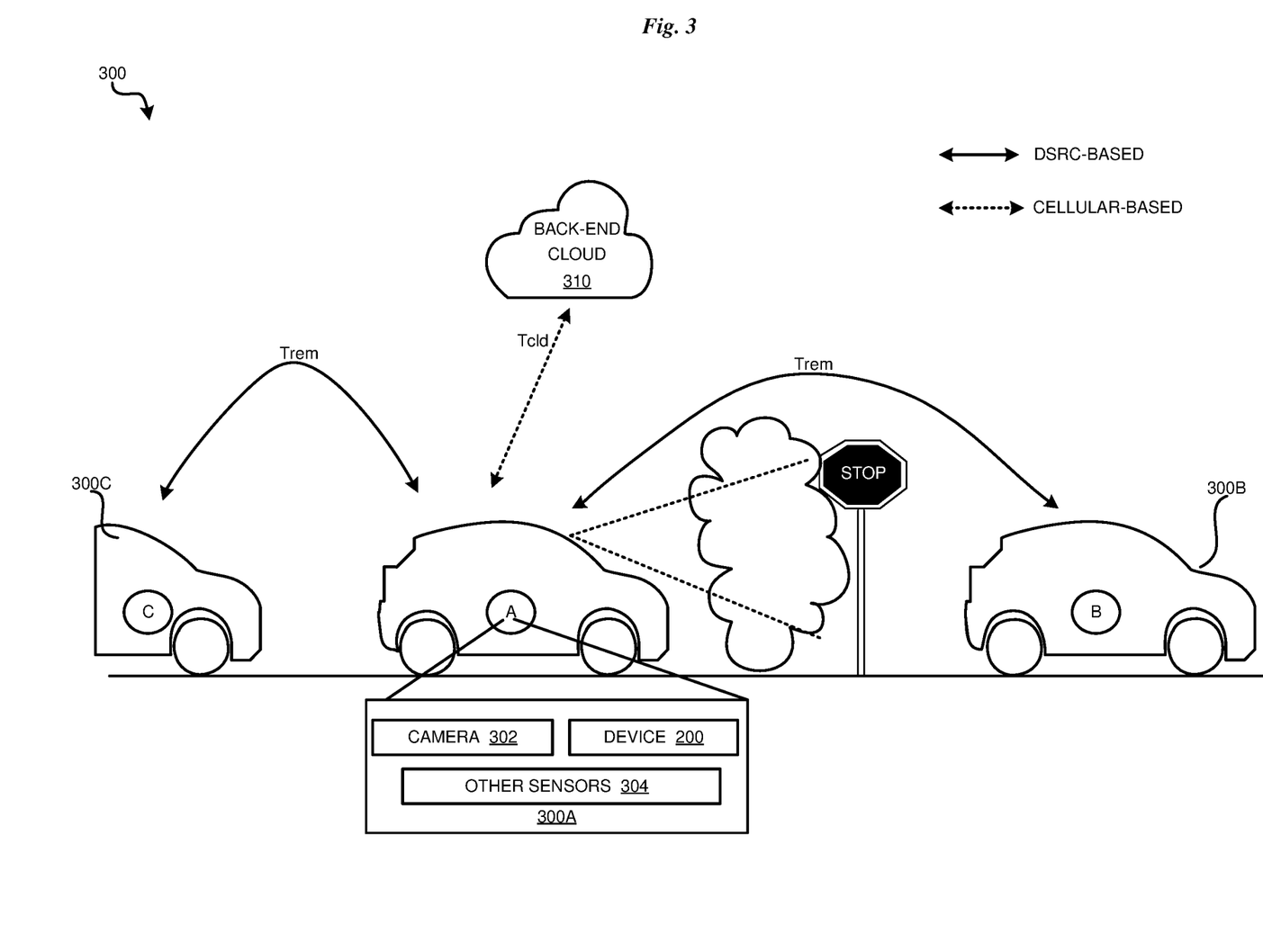
FIG. 3 depicts a block diagram of an example configuration for adaptive multi-device cooperative classification in accordance with an illustrative embodiment.

With reference to FIG. 3, this figure depicts a block diagram of an example configuration for adaptive multi-device cooperative classification in accordance with an illustrative embodiment. FIG. 3 includes autonomous vehicles 300A, 300B, and 300C. Each vehicle includes device 200, which is the same as device 200 in FIG. 2. Each vehicle also includes camera 302 and other sensors 304. Vehicle 300A can communicate with vehicles 300B and 300C via dedicated short range communication (DSRC), an Institute of Electrical and Electronics Engineers (IEEE) 802.11p standard for vehicle-to-vehicle communication. Vehicle 300A also communicates with back-end cloud 310, using cellular communication.

These forms of communication are only examples, and are not intended to be limiting. Other forms of communication are known to those of ordinary skill in the art and are contemplated within the scope of the embodiments. Further, camera 302 and other sensors 304 are also non-limiting examples of sensors that could be installed in vehicle 300A. As well, vehicle 300A could also be a truck, boat, airplane, or any other form of vehicle without departing from the scope of the embodiments.

Figure 4:
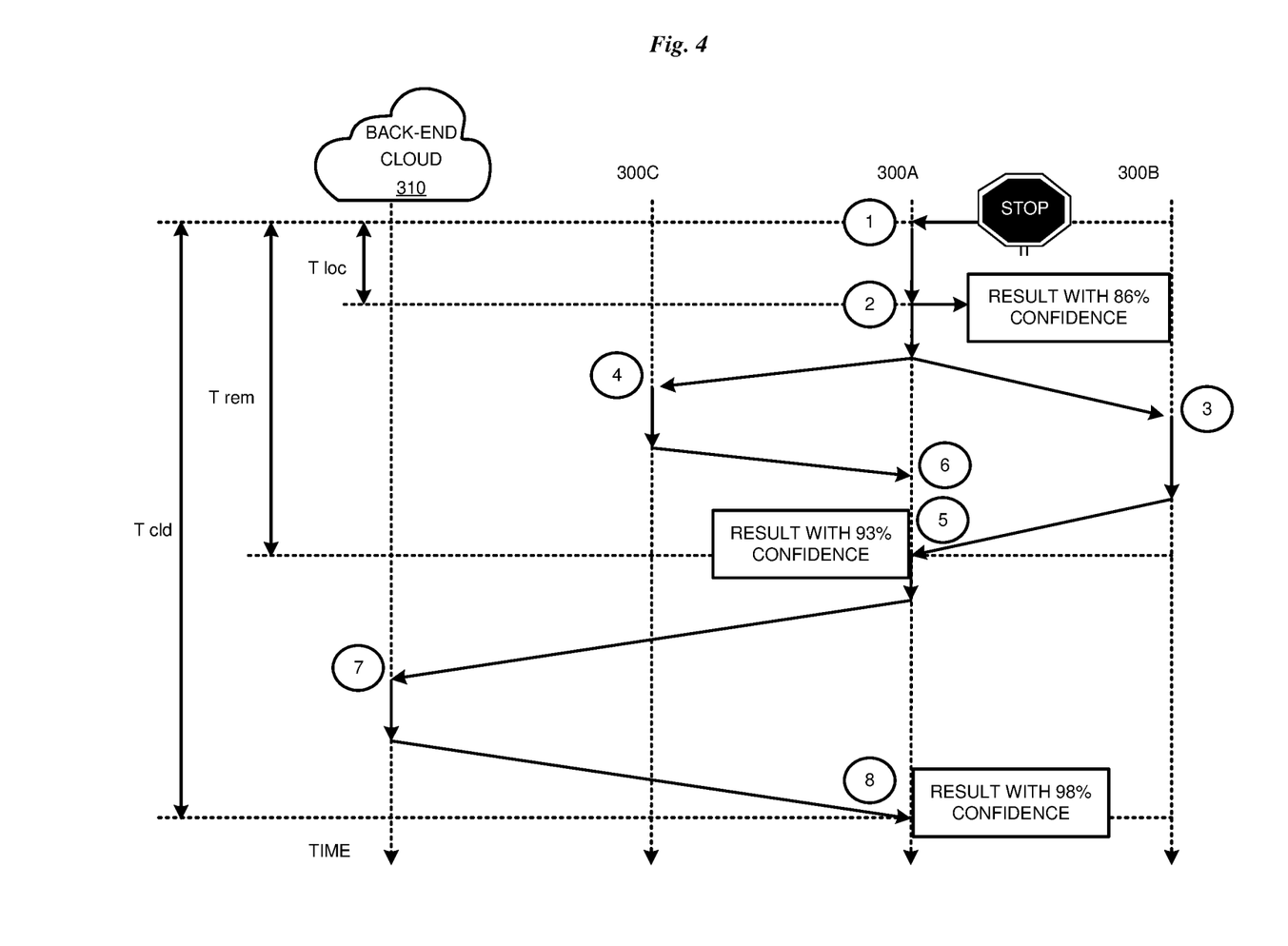
FIG. 4 depicts a diagram of a sequence of events in adaptive multi-device cooperative classification in accordance with the example configuration depicted in FIG. 3.

With reference to FIG. 4, this figure depicts a diagram of a sequence of events in adaptive multi-device cooperative classification in accordance with the example configuration depicted in FIG. 3.

At time 1, camera 302 in vehicle 300A receives an event input, for example an image depicting a stop sign, requiring classification. In response, at time 2 vehicle 300A computes a local classification corresponding to the event input and an example 86 percent confidence score. Vehicle 300A computes the classification and confidence score based on an internal classification model, which has been previously trained to classify sensor data event inputs into categories based on known machine learning techniques. As well, because vehicle 300A is performing classification locally, the result is available at time 2, rather than at later times.

Vehicle 300A also broadcasts a request to other devices also capable of classifying the same event input. Here, at time 4, vehicle 300C receives the request and responds with its own classification and confidence score, which vehicle 300A receives at time 6. In parallel, at time 3, vehicle 300B receives the request and responds with its own classifications and confidence score, which vehicle 300A receives at time 5.

Once any remote classifications are received, vehicle 300A determines a consensus classification, using a local classification (if above a confidence threshold) as well as any remote classifications. Vehicle 300A also determines a consensus classification confidence score corresponding to the consensus classification. As shown here, the consensus classification confidence score is for example, 93 percent.

As a result, vehicle 300A, determining that the confidence score could be improved, also broadcasts a request to back end cloud 310, which is also capable of classifying the same event input. At time 7, back end cloud 310 receives the request and responds with its own classification and confidence score, which vehicle 300A receives at time 8. Vehicle 300A incorporates this new result into a new consensus classification, now with a 98 percent confidence score.

The decision to ask for an additional information from back end cloud 310 is a tradeoff between having an opportunity to improve the reliability of the classification decision and the extra time required to send the request and receive an answer. Alternatively, time could be saved at the expense of additional cellular data use by configuring vehicle 300A to always broadcast a request to back end cloud 310 at the same time as broadcasting to vehicles 300B and 300C.

Once vehicle 300A has determined a sufficiently reliable consensus classification, the vehicle's classification model can be updated. Here, the consensus classification, using input from vehicles 300A, 300B, and 300C as well as back end cloud 310, is that the image is a stop sign, and vehicle 300A uses this information to improve its internal recognition model for stop signs. Finally, vehicle 300A stops at an appropriate location relative to the recognized stop sign.

Figure 5:
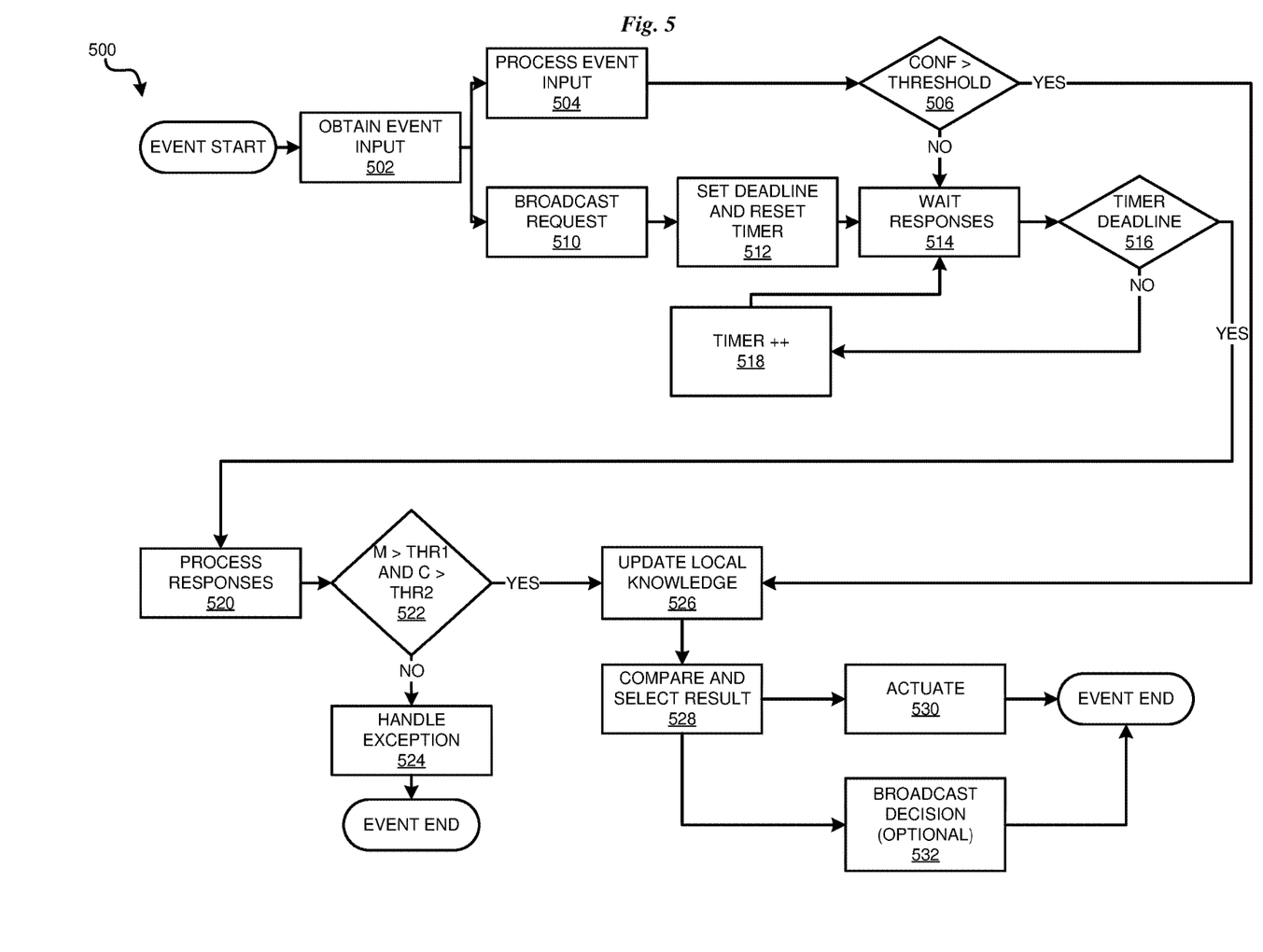
FIG. 5 depicts a flowchart of an example application for adaptive multi-device cooperative classification in accordance with an illustrative embodiment.

With reference to FIG. 5, this figure depicts a flowchart of an example application 500 for adaptive multi-device cooperative classification in accordance with an illustrative embodiment. Application 500 can be implemented in application 105 in FIG. 1 or vehicle 30A in FIG. 3.

In block 502, the application obtains an event input. In block 504, the application processes the event input, computing a local classification and a local classification confidence score corresponding to the event input. In block 506, the application determines whether the local classification confidence score exceeds a threshold. If so ("YES" path of block 506), the local classification is deemed reliable enough for further use; if not ("NO" path of block 506), execution moves to block 514.

In block 510, the application broadcasts a request for remote classification. In block 512, the application sets a deadline and starts a timer. The application then waits for remote responses (block 514) and checks for timer expiration (block 516). If the timer has not expired ("NO" path of block 516), the application increments the timer (block 518) and continues to wait (block 514).

Once the timer expires ("YES" path of block 516), in block 520 the application determines a consensus classification and a consensus classification confidence score, based on the local classification score if sufficiently reliable ("YES" path of block 506) and any remote classifications that have been received. In block 522 the application checks that the most frequent classification exceeds a threshold, and that the confidence score corresponding to the most frequent classification also exceeds a threshold. If either is false ("NO" path of block 522), the consensus classification is not sufficiently reliable, and the application handles the exception (block 524) and ends processing of the event. If both are true ("YES" path of block 522), in block 526 the application updates a local classification model.

In block 528, the application classifies the event, based on the local classification (from "YES" path of block 506) and the consensus classification (from block 526). In block 530, the application acts on the classification, and in block 532, the application broadcasts the classification.

Figure 6:
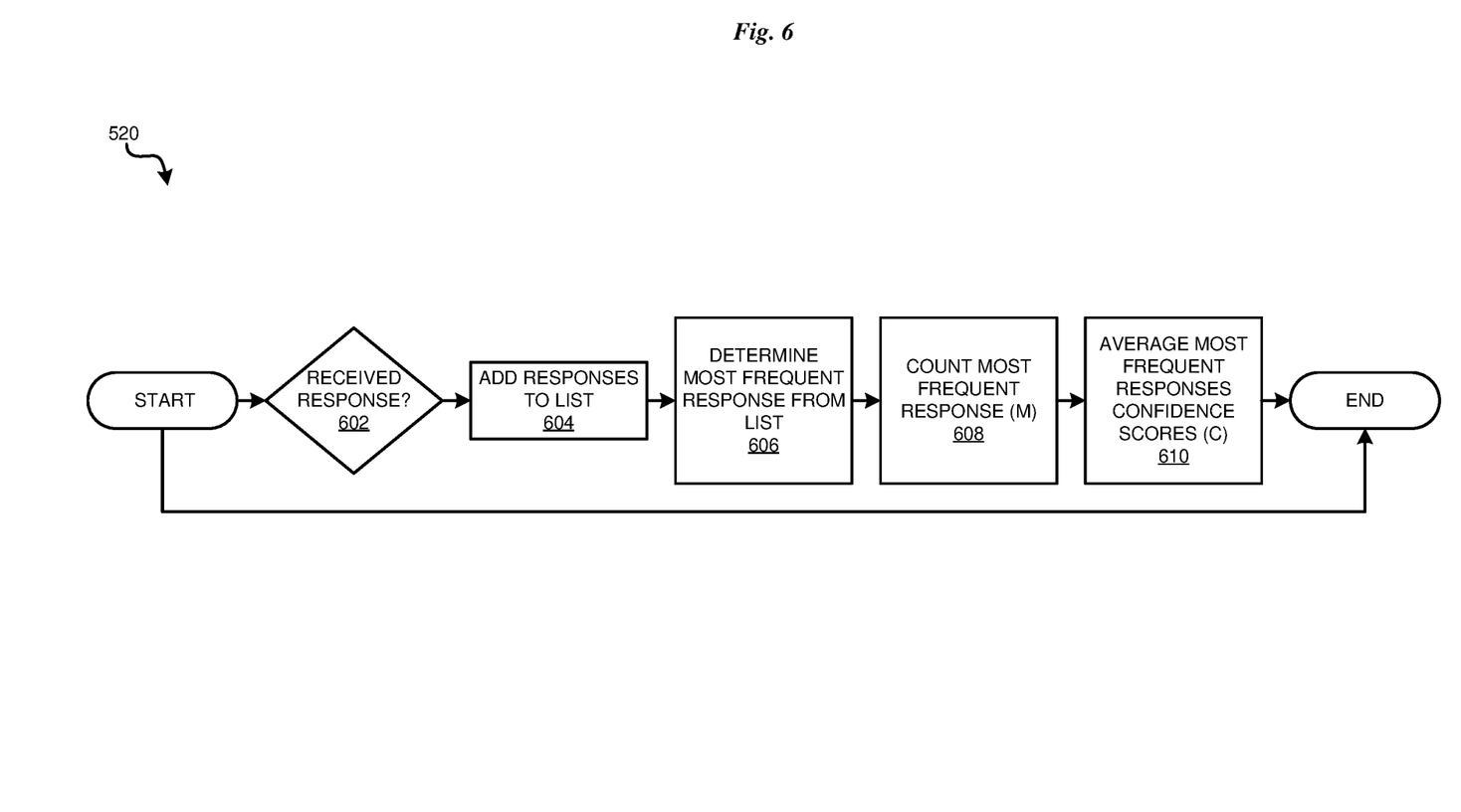
FIG. 6 depicts a flowchart showing more detail of a block in FIG. 5.

With reference to FIG. 6, this figure depicts a flowchart showing more detail of block 520 in FIG. 5. In block 602 the application checks for receipt of a classification; if not ("NO" path of block 602) processing ends. If there is at least one classification response to process ("YES" path of block 602), in block 604 responses are added to a list. In block 606, the application determines the most frequent classification in the list—this is the consensus classification. In block 608, the application counts the number of classifications corresponding to the consensus classification. In block 610, the application computes a weighted average of all the classification confidence scores corresponding to the consensus classification.

Thus, a computer implemented method, system or apparatus, and computer program product are provided in the illustrative embodiments for intelligent insertion of secondary content in live streaming and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    computing, in a first autonomous vehicle (AV) in response to an event input using a processor and a memory, using a local classification model trained using a first machine learning training protocol, a local classification and a local classification confidence score corresponding to the event input;
    receiving, at the first AV in response to a broadcast request, a remote classification and a remote classification confidence score corresponding to the event input, the remote classification and the remote classification confidence score being computed at a second device using a remote classification model, wherein the remote classification model is trained using a different machine learning training protocol from the first training protocol;
    forming, at the first AV, a consensus classification, the consensus classification comprising a most frequent classification from a set of classifications, wherein the set of classifications comprises all received remote classifications including the remote classification, wherein the set of classifications further includes the local classification responsive to determining that the local classification confidence score is above a local confidence threshold;
    computing, at the first AV, a consensus classification confidence score corresponding to the consensus classification, the consensus classification confidence score comprising a weighted average of classification confidence scores corresponding to classifications in the consensus classification, a weight of each classification confidence score adjusted according to correctness of a previous classification performed by a third device of a same type as a device performing a classification in the consensus classification;
    assigning, at the first AV, responsive to determining that there are equal to or less than a first threshold number of classifications in the most frequent classification or that the consensus classification confidence score is equal to or less than a second threshold, the event input to the local classification; and
    stopping the first AV at a location, the stopping performed responsive to assigning the first view of the event input to the local classification.

2. The computer-implemented method of claim 1, wherein the weight of the remote classification confidence score is further adjusted according to the correctness of previous classifications performed by the third device, the previous classifications performed during an environmental condition matching an environmental condition in which the remote classification is performed.

3. The computer-implemented method of claim 1, further comprising:
    assigning, at the first AV, responsive to determining that there are greater than the first threshold number of classifications in the most frequent classification and that the consensus classification confidence score is greater than the second threshold, the event input to the consensus classification.

4. The computer-implemented method of claim 1, further comprising broadcasting the classified event input.

5. The computer-implemented method of claim 1, wherein the event input comprises sensor data.

6. A computer usable program product comprising one or more computer-readable storage media, and program instructions stored on at least one of the one or more storage media, the stored program instructions comprising:
    program instructions to compute, in a first autonomous vehicle (AV) in response to an event input using a processor and a memory, using a local classification model trained using a first machine learning training protocol, a local classification and a local classification confidence score corresponding to the event input;
    program instructions to receive, at the first AV in response to a broadcast request, a remote classification and a remote classification confidence score corresponding to the event input, the remote classification and the remote classification confidence score being computed at a second device using a remote classification model, wherein the remote classification model is trained using a different machine learning training protocol from the first training protocol;
    program instructions to form, at the first AV, a consensus classification, the consensus classification comprising a most frequent classification from a set of classifications, wherein the set of classifications comprises all received remote classifications including the remote classification, wherein the set of classifications further includes the local classification responsive to determining that the local classification confidence score is above a local confidence threshold;
    program instructions to compute, at the first AV, a consensus classification confidence score corresponding to the consensus classification, the consensus classification confidence score comprising a weighted average of classification confidence scores corresponding to classifications in the consensus classification, a weight of each classification confidence score adjusted according to correctness of a previous classification performed by a third device of a same type as a device performing a classification in the consensus classification;
    program instructions to update, at the first AV, responsive to determining that there are greater than a first threshold number of classifications in the most frequent classification and that the consensus classification confidence score exceeds a second threshold, the local classification model;
    program instructions to assign, at the first AV, responsive to determining that there are equal to or less than the first threshold number of classifications in the most frequent classification or that the consensus classification confidence score is equal to or less than the second threshold, the event input to the local classification; and
    program instructions to stop the first AV at a location, the stopping performed responsive to assigning the first view of the event input to the local classification.

7. The computer usable program product of claim 6, wherein the weight of the remote classification confidence score is further adjusted according to the correctness of previous classifications performed by the third device, the previous classifications performed during an environmental condition matching an environmental condition in which the remote classification is performed.

8. The computer usable program product of claim 6, further comprising:
    program instructions to assign, at the first AV, responsive to determining that there are greater than the first threshold number of classifications in the most frequent classification and that the consensus classification confidence score is greater than the second threshold, the event input to the consensus classification.

9. The computer usable program product of claim 6, further comprising broadcasting the classified event input.

10. The computer usable program product of claim 6, wherein the event input comprises sensor data.

11. The computer usable program product of claim 6, wherein the computer usable code is stored in a computer readable storage medium in a data processing system, and wherein the computer usable code is transferred over a network from a remote data processing system.

12. The computer usable program product of claim 6, wherein the computer usable code is stored in a computer readable storage medium in a server data processing system, and wherein the computer usable code is downloaded over a network to a remote data processing system for use in a computer readable storage medium associated with the remote data processing system.

13. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions when executed by a processor causing operations comprising:

receiving, in a camera in a first autonomous vehicle (AV), a first image of a scene, the first image depicting a first view of the scene in a first atmospheric condition;

computing, at the first AV using a local classification model processing the first image, a local classification and a local classification confidence score corresponding to the first image, wherein the local classification model is trained using a first machine learning training protocol;

receiving, at the first AV in response to a broadcast request, a remote classification and a remote classification confidence score, the remote classification and the remote classification confidence score being computed at a second AV using a first remote classification model, wherein the first remote classification model is trained using a different machine learning training protocol from the first training protocol, the remote classification performed on a second image of the scene using a camera in the second AV, the second image of the scene depicting a second view of the scene in a second atmospheric condition;

forming, at the first AV, a consensus classification, the consensus classification comprising a most frequent classification from a set of classifications, wherein the set of classifications comprises all received remote classification, wherein the set of classifications further includes the local classification responsive to determining that the local classification confidence score is above a local confidence threshold;

computing, at the first AV, a consensus classification confidence score corresponding to the consensus classification, the consensus classification confidence score comprising a weighted average of classification confidence scores corresponding to classifications in the consensus classification, a weight of each classification confidence score adjusted according to correctness of a previous classification performed by another device of a same type as a device performing a classification in the consensus classification;

updating, at the first AV, responsive to determining that there are greater than a first threshold number of classifications in the most frequent classification and that the consensus classification confidence score exceeds a second threshold, the local classification model, the updating resulting in an updated local classification model usable in a new scene in the first atmospheric condition;

assigning, at the first AV, responsive to determining that there are equal to or less than the first threshold number of classifications in the most frequent classification or that the consensus classification confidence score is equal to or less than the second threshold, the first view of the scene to the local classification; and stopping the first AV at a location, the stopping performed responsive to assigning the first view of the scene to the local classification.

* * * * *